United States Patent [19]
Bigby et al.

[11] Patent Number: 5,402,527
[45] Date of Patent: Mar. 28, 1995

[54] APPARATUS AND METHOD FOR DETERMINING THE PAGE DESCRIPTION LANGUAGE IN WHICH A PRINT JOB IS WRITTEN

[75] Inventors: Bruce W. Bigby, Fairport; Mark D. O'Brien, Henrietta; Edward E. Brindle, Webster, all of N.Y.

[73] Assignee: Xerox Corporation, Stamford, Conn.

[21] Appl. No.: 52,498

[22] Filed: Apr. 23, 1993

[51] Int. Cl.⁶ ............................................. G06F 15/20
[52] U.S. Cl. ........................................................ 395/101
[58] Field of Search ............... 395/108, 109, 112, 113, 395/114, 116, 101

[56] References Cited

U.S. PATENT DOCUMENTS

| | | | |
|---|---|---|---|
| 3,597,071 | 7/1971 | Jones | 355/3 |
| 3,920,895 | 11/1975 | Vieri et al. | 178/26 |
| 3,958,088 | 5/1976 | Vieri | 178/26 |
| 4,623,244 | 11/1986 | Andrews et al. | 355/24 |
| 4,651,278 | 3/1987 | Herzog et al. | 364/300 |
| 4,899,136 | 2/1990 | Beard et al. | 340/706 |
| 4,937,036 | 6/1990 | Beard et al. | 340/706 |
| 4,939,507 | 7/1990 | Beard et al. | 340/706 |
| 4,947,345 | 8/1990 | Paradise et al. | 364/519 |
| 4,968,159 | 11/1990 | Sasaki et al. | 395/113 |
| 4,992,957 | 2/1991 | Aoyama et al. | 395/112 |
| 5,008,853 | 4/1991 | Bly et al. | 364/900 |
| 5,050,098 | 9/1991 | Brown, III et al. | 395/112 |
| 5,065,347 | 11/1991 | Pajak et al. | 395/159 |
| 5,072,412 | 12/1991 | Henderson, Jr. et al. | 395/159 |
| 5,075,874 | 12/1991 | Steeves et al. | 395/112 |
| 5,113,355 | 5/1992 | Nomua | 395/109 |
| 5,113,517 | 5/1992 | Beard et al. | 364/200 |
| 5,133,048 | 7/1992 | Parsons et al. | 395/111 |
| 5,153,577 | 10/1992 | Mackey et al. | 340/793 |
| 5,165,014 | 11/1992 | Vassor | 395/112 |
| 5,170,340 | 12/1992 | Prokop et al. | 364/143 |
| 5,226,112 | 7/1993 | Mensing et al. | 395/114 |
| 5,228,118 | 7/1993 | Sasaki | 395/112 |

*Primary Examiner*—Mark R. Powell
*Assistant Examiner*—U. Chauhan
*Attorney, Agent, or Firm*—Gary B. Cohen

[57] ABSTRACT

There is provided a printing system for producing prints from a print job written in one of a plurality of page description languages with the print job assuming the form of a print job stream. The printing system includes a plurality of page description language analyzing units for sampling the print job stream, each analyzing unit outputting an information signal which provides information regarding the print job stream. A filter, which receives the information signals, processes the information signals and outputs a filtered signal which indicates the page description language in which the print job is written.

15 Claims, 8 Drawing Sheets

FIG. 3

APPARATUS AND METHOD FOR DETERMINING THE PAGE DESCRIPTION LANGUAGE IN WHICH A PRINT JOB IS WRITTEN

The present invention relates generally to a printing system and, more particularly, to a technique which facilitates the interpretation of a print job written in a page description language by determining the page description language in which the print job is written.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to a personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

The following patents include examples of systems noting a network, server and printer [usually for shared users' remote terminals]:

U.S. Pat. No. 3,920,895
Patentee(s): Vieri et al.
Issued: Nov. 18, 1975
U.S. Pat. No. 3,958,088
Patentee(s): Vieri et al.
Issued: May 18, 1976
U.S. Pat. No. 4,651,278
Patentee(s): Herzog et al.
Issued: Mar. 17, 1987
U.S. Pat. No. 4,899,136
Patentee(s): Beard et al.
Issued: Feb. 6, 1990
U.S. Pat. No. 4,937,036
Patentee(s): Sandman Jr. et al.
Issued: Jun. 26, 1990
U.S. Pat. No. 4,939,507
Patentee(s): Beard et al.
Issued: Jul. 3, 1990
U.S. Pat. No. 4,947,345
Patentee(s): Paradise et al.
Issued: Aug. 7, 1990
U.S. Pat. No. 5,008,853
Patentee(s): Bly et al.
Issued: Apr. 16, 1991
U.S. Pat. No. 5,113,355
Patentee(s): Nomura
Issued: May 12, 1992
U.S. Pat. No. 5,065,347
Patentee(s): Pajak et al.
Issued: Nov. 12, 1991
U.S. Pat. No. 5,072,412
Patentee(s): Henderson Jr. et al.
Issued: Dec. 10, 1991
U.S. Pat. No. 5,113,517
Patentee(s): Beard et al.
Issued: May 12, 1992
U.S. Pat. No. 5,153,577
Patentee(s): Mackey et al
Issued: Oct. 6, 1992

Pertinent portions of the above-cited references are incorporated by reference.

Other examples of printer controls include:
U.S. Pat. No. 5,133,048
Patentee(s): Parsons et al.
Issued: Jul. 21, 1992
U.S. Pat. No. 5,170,340
Patentee(s): Prokop et al.
Issued: Dec. 8, 1992
Now allowed U.S. patent application Ser. No. 07/591,324
Charles LeComte
"The Xerox DocuTech® Production Publisher"
BIS CAP International, Newtonville, Mass.
October 1990

Pertinent portions of the above-cited references are incorporated by reference.

By way of further background, the concept of various scanned paper or electronic imaging transmission input devices selectably electronically interfaced or networked to a flexible modular printer has been disclosed in the following patents:

U.S. Pat. No. 3,597,071
Patentee(s) Burton
Issued: Jul. 27, 1971
U.S. Pat. No. 4,623,244
Patentee(s): Andrews et al
Issued Nov. 18, 1986

Pertinent portions of the above-cited references are incorporated by reference.

Xerox ® Corporation presently is marketing a server for a printing apparatus, the server being referred to as the DocuTech® Network Server ("DocuTech Network Server" is a trademark of Xerox Corp.) This server is adapted to translate a job written in a first PDL, such as Postscript ® ("PS") or Hewlett Packard Printer Control Language ("HP-PCL"), into a second PDL, such as Interpress, for printing of the job on a Xerox ® compatible printing apparatus. At the heart of the server are two interpreters, one of which is adapted to translate PS and the other of which is adapted to translate HP-PCL. Each interpreter contains software, written by either Adobe ® Systems Inc. or Peerless ® Corp. to facilitate the translation process. Additionally, Eastman Kodak produces a network printing system, known as "LionHeart ™", which employs a print server. Finally, the following reference is of interest in the network systems area:

Cheryl E. Currid and Craig A. Gillett
"Mastering Novell ® Netware ®"
SYBEX, Inc., Alameda, Calif.
1990

A PDL is a method of describing printed page(s) in a printer independent format. A PDL establishes an interface between a print driver or client and a print server or printer. The following references are pertinent to the area of page description languages:

PostScript ® Language Reference Manual
Second Edition
Addison-Wesley Publishing Co.
1990

PCL 5 Printer Language
Technical Reference Manual
First Edition
Hewlett Packard Co.
1990

Harrington, S. J. and Buckley, R. R.
Interpress: The Source Book
Simon & Schuster, Inc.
New York, N.Y.
1988

As is noted in art cited above, the control of, and software for, printers in a system or network environment can be in the printer itself. Commonly, however, a major part of the system printer integration software operation may be in the print server connected into the system, (typically a stand alone but dedicated small computer or PC). The server typically functions as a "spooler" to buffer the jobs that are sent to it, as well as a page description language (PDL) "decomposer", for converting the PDL files (e.g., "Interpress TM" or "PostScript ®") to bitmapped files for application to the printer.

Another example of an established commercial integral system, with a shared printer and system server, comprises the Xerox Corporation "VP Local Laser Printing" software application package, which, together with the Xerox "4045" (or other) Laser Copier/Printer (CP), the "6085" "Professional Computer System" using Xerox Corporation "ViewPoint" or "GlobalView ®" software and a "local printer [print service] Option" kit, comprises the "Documenter" system. The laser printer prints text and graphics with high quality resolution on a variety of paper sizes and special papers, including transparencies, labels, and envelopes. Printing occurs as a background process, enabling system users to continue with other desktop activities at their terminals. VP Local Laser Printing software can be loaded at a networked, remote, or standalone Xerox "6085" Professional Computer System (workstation).

The even earlier Xerox Corporation "8000" "Xerox Network Services Product Descriptions" text further describes other commercially available Xerox Corporation electronic document printing systems. It notes that such document systems can support the capabilities of remote workstations, PC terminals, and facsimile devices, and connect them for shared use of an electronic printer, usually via a print server and/or shared user interface formatting print service. The software system can also control local print job queue management, etc. The print service will accept a print job from any device with access to the network which can be formatted or reformatted to the Xerox Interpress TM [or other such electronic printing standard or printing protocol].

It allows the client to submit a printing job, including an Interpress TM or other such standard master and a number of job parameters, such as paper size, number of copies, and device-specific information. The printing protocol also allows the client to query the print service regarding the status of the job, for user notification.

The electronic printing standard includes a specific set of instructions for printing in a standard for representing documents digitally. The Interpress TM standard for representing printed pages is supported by a wide range of Xerox ® Corporation other products. The print service understands and processes Interpress TM instructions received from a workstation, transforming them into a format understood by the printer. The Interpress TM standard is comprehensive; it can represent any images that can be applied to paper (including complex graphics) and a wide variety of font styles and characters. Each page of an "Interpress TM" master can be interpreted independently of others. This allows a user to easily produce new masters from existing ones and allows the printer to selectively print pages from any master it receives.

Although a "formatting print service" may not have a printer directly attached, it can perform much the same as a print service that does. The typical principal difference is the transferring of an Interpress TM master into an internal format understood by the printer. The formatting print service creates a secondary Interpress TM master which accurately represents the same image but in a subset of Interpress" which can be directly processed by the designated or target printer. This secondary Interpress TM master is then transmitted to the formatting print service's target printer for processing and printing.

Workstations on the network with conversion software can interact with the print service. This software runs automatically when users request that a document be printed. It converts the document format used by the workstation into an Interpress TM master which is transmitted to the print service. This transfer is implemented by a network queuing subsystem which implements the printing protocol and interfaces with an internal print queue for the tracking of the Interpress TM master. The internal print queue facilitates the movement of documents through the various stages of processing. The queue can hold a large number of documents, which are processed in the order received, or can be reprioritized. Generally, a print job is available in the printer's output tray within minutes after the user initiates the print request. The user can see the status of a print job and its place in the queue by making a request through the print server terminal or at the workstation. The resulting display will tell the user whether the job is being queued, formatted or printed. Once the document has been printed, the print service can delete the Interpress TM master.

The Interpress TM master is also accompanied by properties and options which specify document name, user name, and creation date. The print service interprets the master and then directs the printer during the printing process. This process involves several stages: queuing, formatting, and either printing, transmitting (in the case of facsimile print service) or forwarding to another print service (in the case of the formatting print service). During the printing or Fax transmission stage, messages may be generated to report any problems with the printer, such as a need to replenish the paper supply.

Different workstations can access the print service in different ways. To print a document, desirably the user can simply "copy" or "move" the document, with a mouse click or other command, to a printer icon on the workstation desktop, and set the displayed printing options, as on Xerox Corporation workstations. From other workstations, such as an IBM PC, the user may need to select menu items, or type in commands, to obtain access. The workstation selectable print options can include the number of copies, selected pages to be printed, paper size, image orientation, a choice of printers, and phone numbers when sending to a facsimile device. In addition, the option sheet allows the user to specify whether to delete the Interpress ™ or other master, or retain it at the workstation desktop. Already print-formatted or master documents may be transmitted to the printer directly, eliminating the need to repeat the conversion or decomposition process if another copy of the document is desired. If saved, an Interpress ™ master can be stored at the file service or even mailed to one or more individuals via an electronic mail service.

Utilizing an inter-network routing service, users can transmit Interpress ™ or other printing masters through a network and then across an internet, typically, via telephone lines, twisted pair wires, coaxial cables, microwaves, infrared, and/or other data links, allowing documents created in one location to be automatically routed to a print service and printer hundreds or even thousands of miles away, in seconds or minutes.

As explained above, the DocuTech Network Server is capable of converting an image data file from one page description language into another page description language prior to printing of the image data file. More particularly the following allowed patent application is directed toward a printing system which is capable of processing print jobs, each of which may be written in one of a plurality of PDLs:

U.S. patent application Ser. No. 07/898,045
Title: "Method for Translating a Plurality of Printer Page Description Languages"
Filed: Jun. 12, 1992

In the above application, a print job is transmitted from a client workstation to a print server in which a host processor is coupled with a coprocessor, the coprocessor including an interpreter for translating the incoming PDL to a PDL which is compatible with one or more available printers. If the interpreter in the coprocessor is unable to translate the incoming PDL, then the host processor causes the interpreter to be swapped with a stored interpreter, the stored interpreter being suited to translate the incoming PDL.

It is believed that it is previously suggested to analyze the characteristics of a stream of data written in a PDL. The present invention is an improvement over the foregoing in that the characteristics of a stream of data may be analyzed for determining whether it contains one of a plurality of PDLs.

In accordance with the present invention there is provided a printing system for producing prints from a print job written in one of a plurality of page description languages with the print job assuming the form of a print job stream, including: a plurality of page description language analyzing units for sampling the print job stream, each analyzing unit outputting an information signal which provides information regarding the print job stream; and a filter, receiving each of the information signals, for processing the information signals and outputting a filtered signal which indicates the page description language in which the print job is written.

These and other aspects of the invention will become apparent from the following description, the description being used to illustrate a preferred embodiment of the invention when read in conjunction with the accompanying drawings:

FIG. 3 is a representation of a format for an electronic job ticket;

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
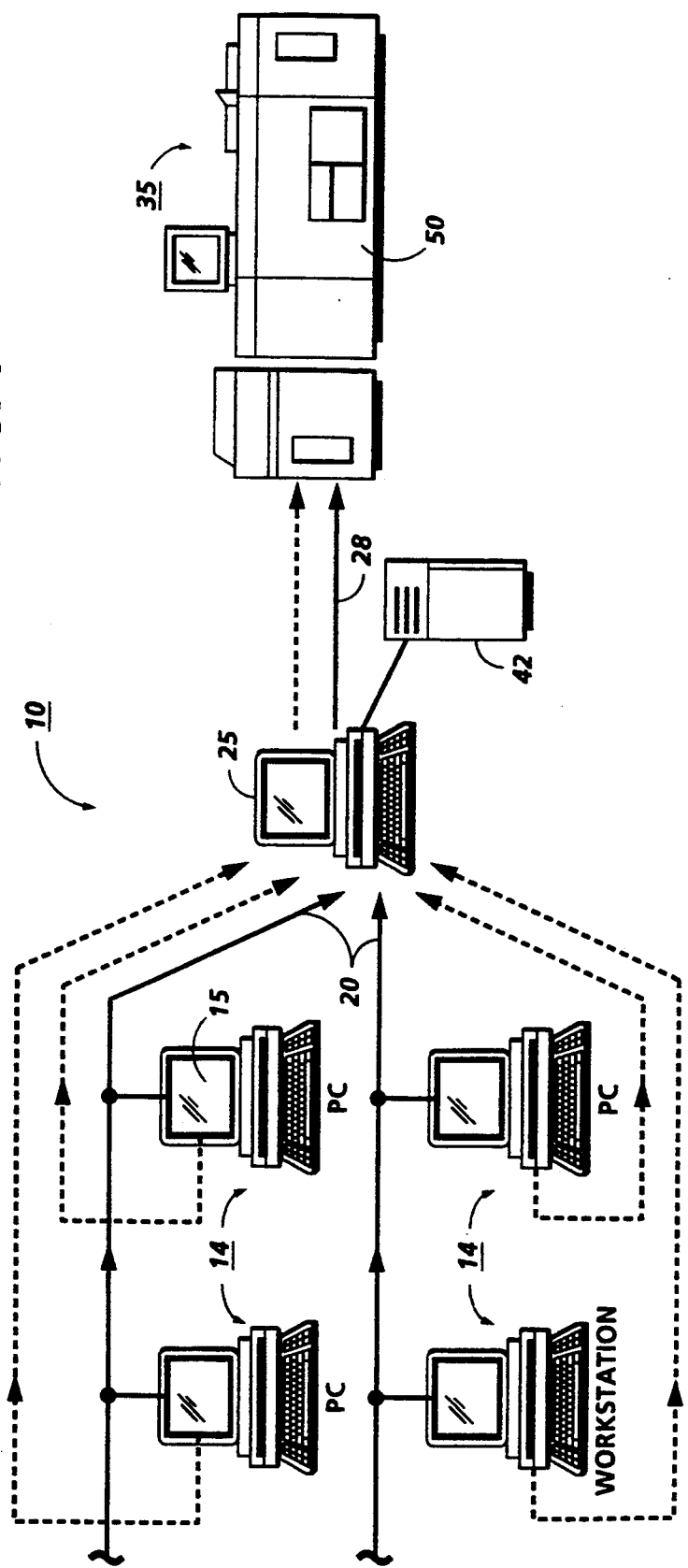
FIG. 1 is a schematic view of a printing system including a plurality of client workstations interfaced with a printer by a print server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
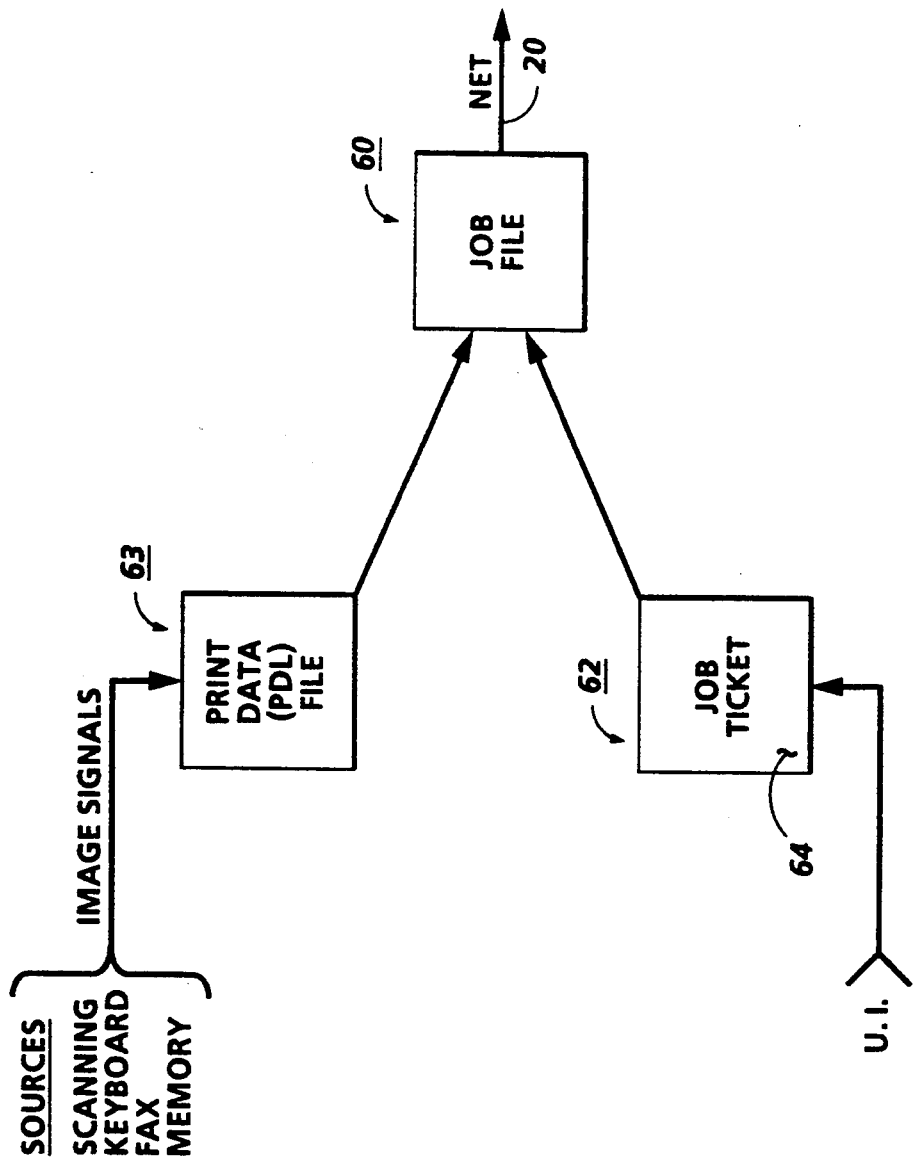
FIG. 2 is a schematic view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a client server job ticket 64 having instructions for routing, handling, and processing the job 62. As will be clarified from the discussion below, in the preferred embodiment of the present invention, the PDL of print data file 63 is either written in Postscript ® ("PS") or Hewlett Packard Printer Control Language ("HP-PCL"). The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the client server job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a client server job ticket 64 with the program selections available with that printer may be displayed at the client's workstation 14 as described more fully in U.S. patent application Ser. No. 07/752,155, filed Aug. 29, 1991, entitled "Dialog Filtering," the pertinent portions of which are incorporated herein. During the printing process, the server 25 transmits the printing instructions from the client server job ticket 64 to the printing system selected.

Figure 3:
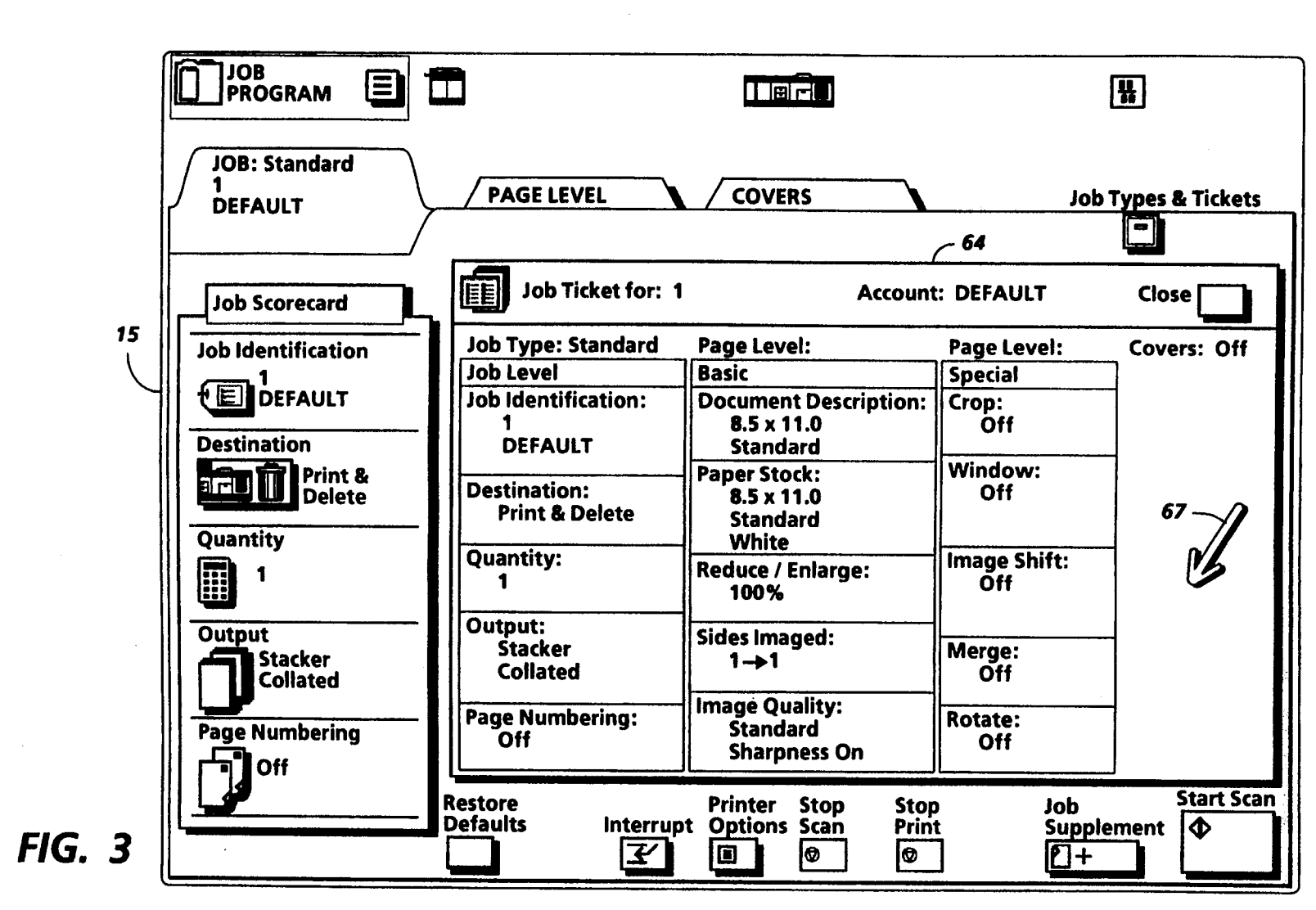

Referring to FIG. 3, the client server job ticket 64 may assume an ASCII format. Additionally, by employment of suitable client UI interface dialog software, print job selections may be displayed on the display screen 15 so that the user can be apprised of which printing selections are available for programming a print job. Examples of client server job ticket displays are shown in U.S. patent application Ser. No. 07/898,045, filed Jun. 12, 1992, entitled "Method of Translating a Plurality of Printer Page Description Languages," the pertinent portions of which are incorporated herein. The client at the workstation interactively fills out the client server job ticket by making selections electronically using the workstation mouse, keyboard, etc. It should be recognized that the client server job ticket instructions encompass not only print programming instructions for the job itself but also routing and handling instructions for the server 25. The completed client server job ticket 64 is combined with the job in Print Data file 63 in the job file 60.

The client server job ticket includes information regarding a print file specification for the job file 60. In the illustrated embodiment of FIG. 3, the print file specification is designated with the parameters: "%XRXsourceFile" and "%XRXdestination". The significance of the print file specification to the present description will be discussed in further detail below.

The server 25 comprises any suitable interface for receiving job files 60 from workstations via network 20, with the ability to access and decode the job processing instructions on the accompanying client server job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 (FIG. 1) may be provided for this purpose.

The printing system 35 may include one or more high speed electronic printers 50 for processing jobs in accordance with the instructions input through the client server job ticket accompanying each job file. While a single printer 50 is shown, plural printers, either at a single central location or at several remote locations may be envisioned. Printer 50, for example, may be a xerographic based printer of the type shown and described in U.S. Pat. No. 5,170,340 to Prokop et al., the pertinent portions of which are incorporated herein. In other contemplated implementations of the preferred embodiment, the printer 50 could comprise other known printer types such as ink jet, ionographic, LED, and the like.

Figure 4:
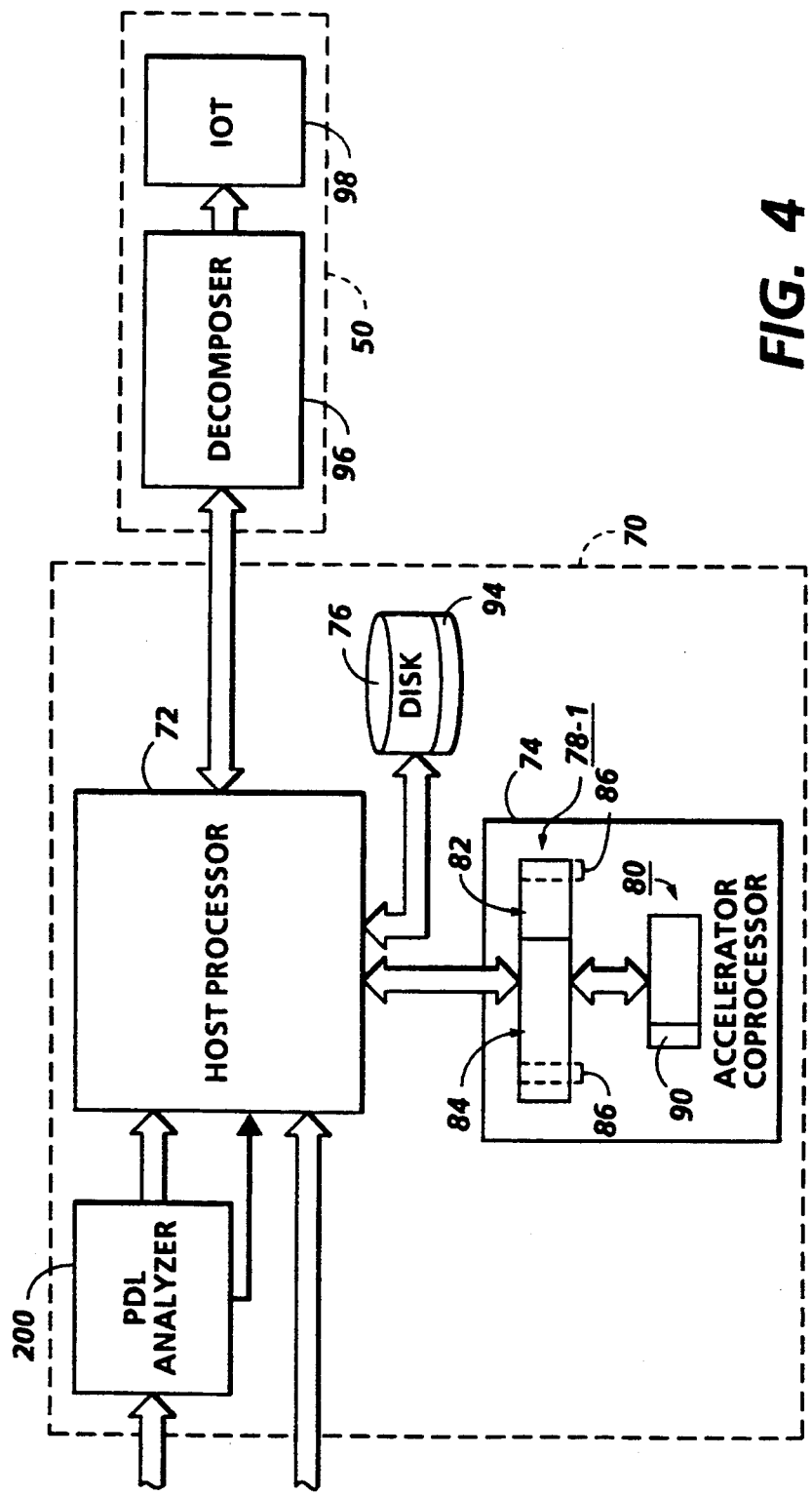
FIG. 4 is a schematic, block diagrammatic view of the printer and print server.

Referring to FIG. 4, the structure of the server 25 and the printing system 35 is discussed in further detail. In the preferred embodiment of the invention, a swapping technique is achieved with an arrangement that is designated by the numeral 70. The software used to operate the arrangement 70 is hereinafter referred to as the "print service application ". The arrangement includes a host processor 72, an accelerator coprocessor (ACP) card 74 and a disk storage device 76. In one example, the host processor is an IBM PC-AT system having an Industry Standard Architecture (ISA) or an Extended Industry Standard Architecture (EISA) bus to accept the ACP card. The host processor 72 can be configured for operation in a network environment. When the host processor 72 is configured for network operation, it is preferably Novell ® certified for Netware 386 TM.

In the preferred embodiment, the ACP card 74 comprises the following major blocks:
80960CA Microprocessor
Host System ISA Interface
Extended Bus Interface
Memory (16 MBytes)
Programmable Read Only Memory
Timer/Counter
256 Byte Board Identification EEPROM The host processor 72 is capable of transferring data to and from ACP memory through a 128K byte sliding shared memory window. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 72 prior to the actual transfer of PDL decomposer code and font cache data. These two ports are referred to as: the Host to Processor and Processor to Host Data Registers ("HPDR" and "PHDR").

Figure 5:
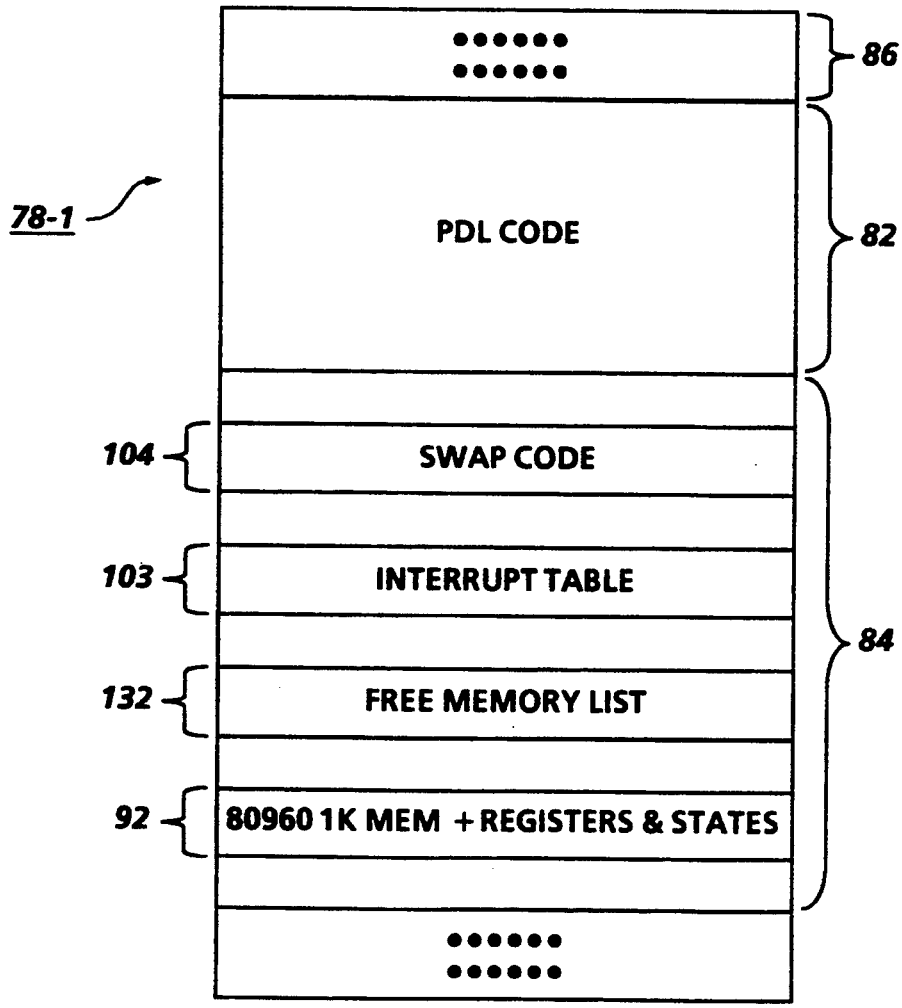
FIG. 5 is a schematic view of a memory map to interpret a page description language.

Referring still to FIG. 4, the ACP card 74 is shown with a memory map 78-1, which memory map 78-1 includes all of the software necessary to interpret a page description language, and the 80960CA microprocessor, the microprocessor being designated by the numeral 80. Referring to FIG. 5, the memory map 78-1, which includes a user section 82 and a system section 84, is shown in greater detail. The memory map 78-1 further includes a section 86 having registers through which the HPDR and the PHDR can communicate and a status flag can be set.

In the illustrated embodiment of FIG. 5, the user section 82 comprises a section for retaining PDL interpretation code, the PDL interpretation code being adapted to facilitate the interpretation of a job file expressed in a first PDL, such as PS or HP-PCL. In the preferred embodiment, the PDL interpretation code is written by either Adobe ® Systems Inc. or Peerless ® Corp., in conjunction with Xerox ® Corp., for use by Xerox ® Corp. in its Xerox Production Print Services System ("Xerox Production Print Services" is a trademark of Xerox ® Corp.), the Xerox Production Print Services System preferably including a Media Server and a Network Server. It should be understood that the PDL interpretation code facilitates translation of the job file 60 from a first PDL, such as PS or HP-PCL, into a second PDL file, such as Interpress. Those skilled in the art will appreciate that such translation could be, in one example, achieved by using a configurable PDL interpreter, such as one manufactured by Adobe ® Systems Inc. or Peerless ® Corp to reduce the text and graphics of the job file 60 into a bitmap and then to express the bitmap in the form of a second PDL, such as Interpress.

It should be appreciated that only selected portions of the system section 84 are shown. It will be recognized by those skilled in the art that, in practice, various software tools, such as tables, e.g., fault, system procedure and control tables, timers and controls therefor, control implementations, storage locations, and stacks, typically would be employed in the implementation of the system section 84.

Referring to FIGS. 4 and 5, the microprocessor 80 includes a section 90 which contains information regarding the internal state of the microprocessor 80, such information including 1K memory, registers and states. This information selectively can be stored in a layer 92 of the system section 84.

Referring specifically to FIG. 4, the host processor 72 is coupled with the disk drive device 76 so that, as explained in further detail below, portions of the memory map 78-1 can be transferred, in the form of a context file, thereto. Preferably, at any one moment, one or more PDL context files, designated by the numeral 94, are stored in the disk drive 76. Upon processing a job file 60, the interpreted PDL file can be transmitted to one of a plurality of output or printing devices. In the preferred embodiment, the interpreted PDL file is expressed in Interpress, and is transmitted to the printer 50 which comprises a decomposer 96 and an image output terminal (IOT) 98. In one example, the decomposer 96 is of the type used in a Xerox ® 4045 ("Xerox 4045" is a trademark used by Xerox ®) printer and employs software of the type described in Interpress: The Source Book. Additionally, the IOT can be any suitable print engine, such as the DocuTech ™ print engine mentioned above. In operating the printer, the interpreted output from the host processor 72 is transmitted to the decomposer 96 where it is decomposed into graphics and text for printing by the IOT 98. Further details regarding the swapping technique implemented with the arrangement 70 is discussed in now allowed U.S. patent application Ser. No. 07/898,045 entitled "Method for Translating a Plurality of Printer Page Description Languages", the pertinent portions of which are incorporated herein.

Figure 6:
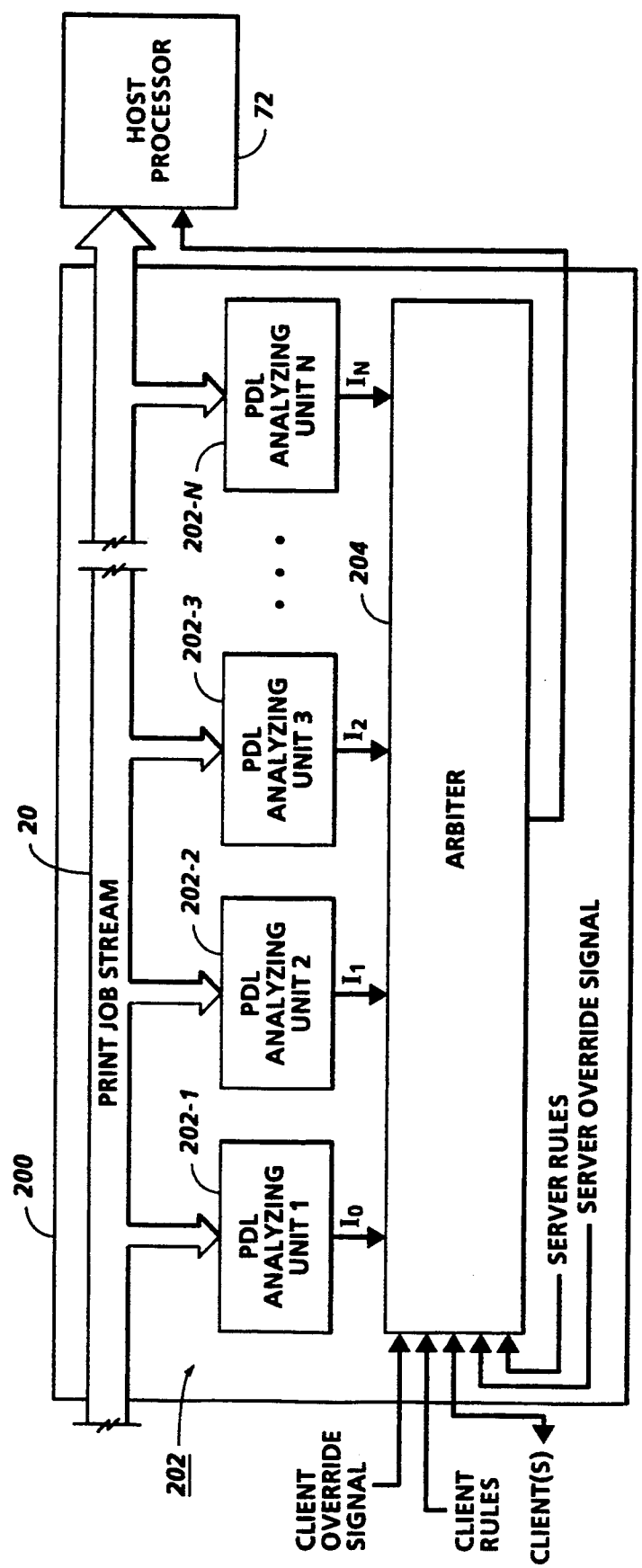
FIG. 6 is block diagram depicting an arrangement for analyzing a print job stream and determining the page description language in which the corresponding print job is written.

Referring to FIGS. 4 and 6, an arrangement for determining the PDL of a print job, transmitted from one of the workstations 14 to the arrangement 70, is designated by the numeral 200. In the illustrated embodiment of FIG. 6, the content of one of the network buses 20, i.e. the content of a PDL stream, is scanned by various PDL analyzing units 202-1, 202-2, 202-3, . . . 202-N (hereinafter referred to conjunctively as "PDL analyzing units 202"). As is known, each print job assumes the form of a stream which is expressed in a PDL, the PDL representing image data and instructions for the print job. In the preferred embodiment, each PDL analyzing unit is capable of analyzing one or more PDL types.

The PDL types may comprise, among others, PCL, PS, Interpress and TIFF. Preferably, one of the PDL analyzing units 202 is a binary filter which is used in conjunction with an arbiter, as explained in further detail below. As will be appreciated by those skilled in the art, the PDL analyzing units comprise a modular system and units can be added or deleted in accordance with the demands of the printing system 10.

For convenience of discussion, the PDL determining arrangement is shown with only one of network buses 20, but, in practice, the arrangement 200 would be used with multiple buses. Additionally, the arrangement 200 is shown as a multi-tasking model in which the stream is sampled in parallel, but in other embodiments, the stream could be sampled with a pipeline model, i.e. in sequence, without affecting the concept upon which the disclosed embodiment is based. Finally, while the arrangement 200 is shown as being part of the arrangement 70, the arrangement 200 could be a service separate from the arrangement 70.

In one preferred embodiment, each of the PDL analyzing units is a processor upon which software, suitable for analyzing the print job stream, is implemented. In another embodiment, the PDL analyzing units could be implemented in a multi-tasking system. As the print job stream is analyzed by the units 202, they transmit information signals $I_0, I_1, I_2, \ldots I_N$, respectively, to an arbiter 204.

In one example, the arbiter (or "best guess arbiter") is a logical device or redundancy filter which is adapted to resolve ambiguities and set precedents. The arbiter 204, is preferably implemented with a combination of hardware and software, and is programmable. In the preferred embodiment, the arbiter communicates with various inputs other than the information signals. These other inputs, the significance of which will be described in further detail below, include a "client" signal, a "client rules" signal, a "client over-ride" signal, a "server rules" signal and a "server override" signal. The primary purpose of the arbiter is to process the information signals for outputting a signal indicating the PDL of the print job stream. As shown in FIG. 6, that output signal is transmitted from the arbiter 204 to the host processor 72.

Figure 7:
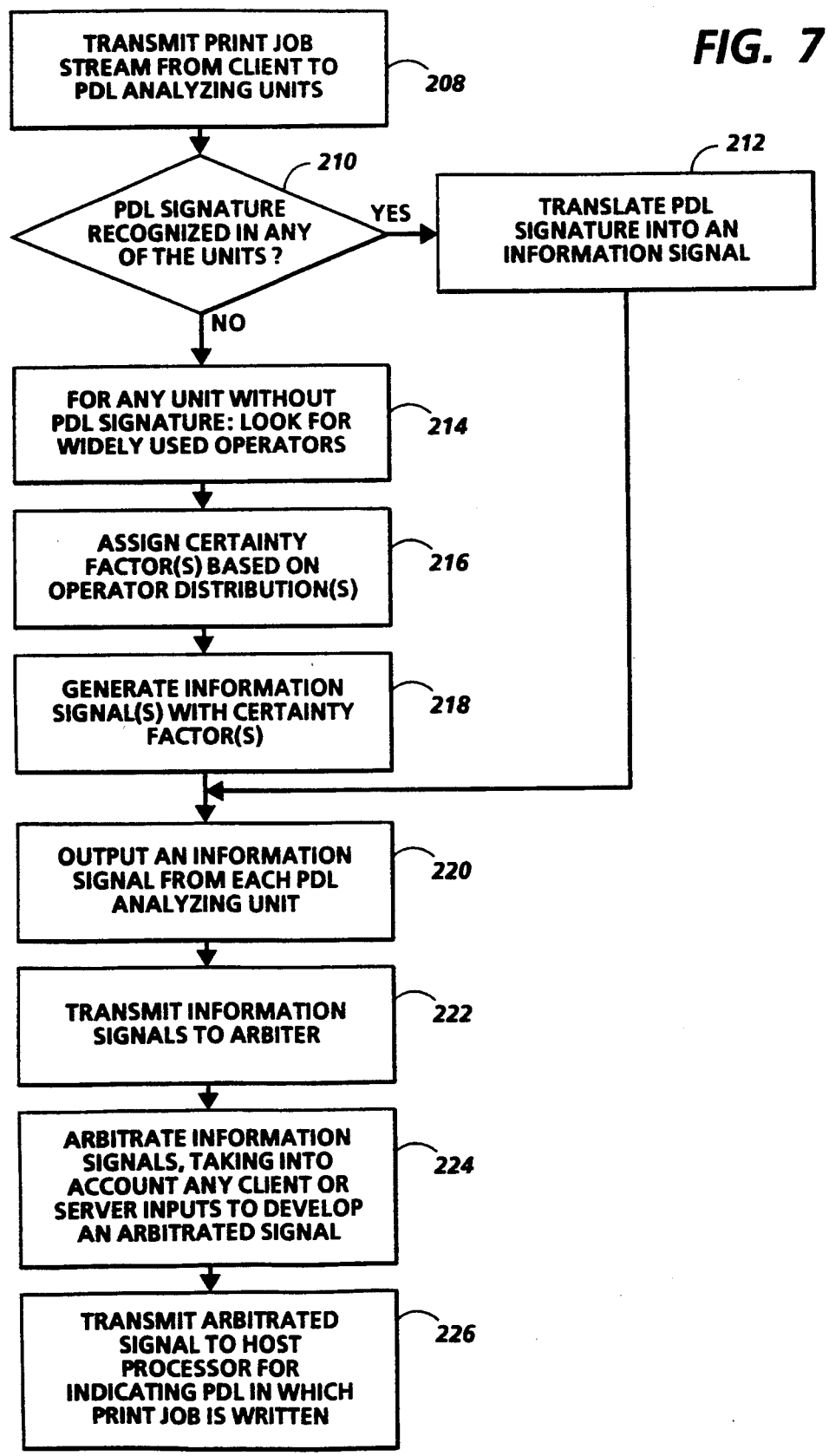
FIG. 7 is a flow diagram illustrating an implementation for use with the analyzing arrangement of FIG. 6.

Referring to FIG. 7, a discussion regarding the implementation of the PDL determining arrangement 200 is provided. In step 208 the print job stream is communicated to the PDL analyzing units 202. Some PDLs are recognized by their "signatures" while other PDLs are recognized by the frequency of occurrence of certain "operators" An example of a PDL characterized by a signature is Interpress, while a PDL characterized by the frequent occurrence of certain operators is PS. An example of an Interpress signature, as discussed above in the reference by Harrington, is a "header" portion. In step 210, each unit examines the stream to determine if a signatures is present. If a signature is present, then the PDL signature is translated into an information signal and transmitted to the arbiter 204 via step 220. For any units without a signature, a negative indication is sent to the arbiter 204 from any PDL analyzing unit that identifies PDLs solely on the basis of a signature.

Figure 8:
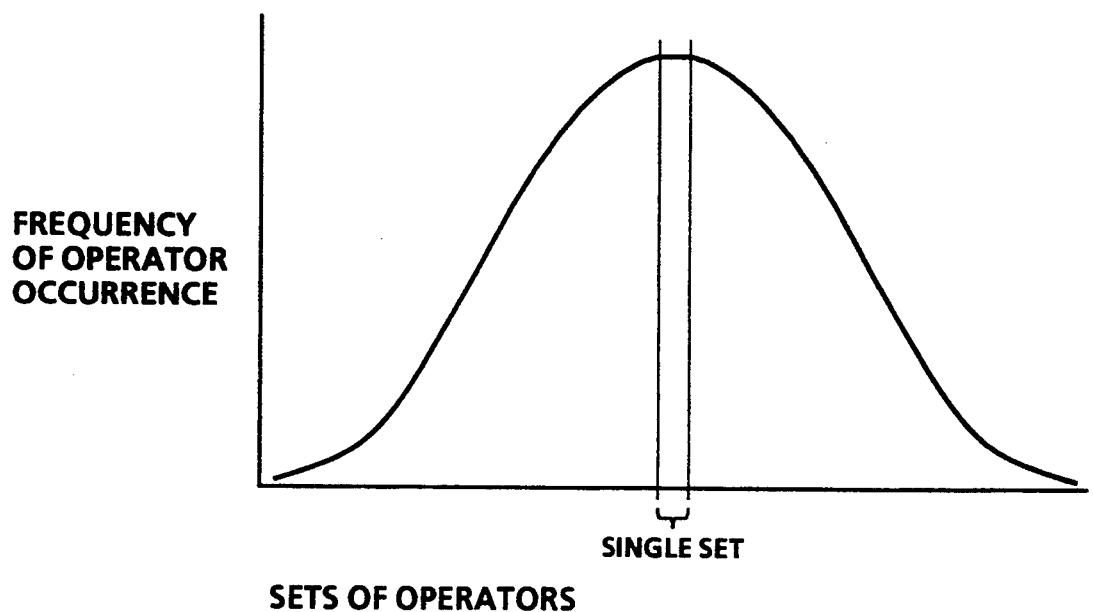
FIG. 8 is a graphic representation of a sample distribution outputted by an analyzing unit of FIG. 6.

As the process proceeds to step 214, the nonsignature based PDL analyzing units scan the print job stream for either a single operator or sets of operators. After scanning a print job stream, with operators, for a selected interval, a distribution indicating the frequency of occurrence of one operator or selected sets of operators can be developed by at least one of the PDL analyzing units which recognizes a PDL on the basis of operator content. Referring to FIG. 8, a sample distribution for one of the operator-based units is shown. In this sample distribution, one set of operators corresponds with the maximum of the distribution curve. Preferably a certainty factor, which corresponds to a specific PDL type or a specific PDL version type, is assigned in view of the operator set that is mapped with the distribution curve maximum. To demonstrate the manner in which this assignment technique functions, an example follows.

In one example, the PDL may be one of three related types, namely PS Level 1, PS Level 2 or Binary PS Level 2. Assuming that only one PDL analyzing unit is provided to recognize all three related types, then one of four distinct certainty factors is assigned for the one unit. That is, a null factor is assigned when neither of the three related types is communicated to the one PDL analyzing unit and one of three certainty factors is assigned when one of the three related types is communicated to the one PDL analyzing unit.

In another embodiment, a PDL analyzing unit would be provided for every conceivable PDL type or version to be analyzed by the PDL determining arrangement 200. In this embodiment, there would be no need to assign certainty factors. Rather, each PDL analyzing unit would simply indicate whether a particular PDL had passed through it or not.

For the embodiment in which a certainty factors are assigned, respective, corresponding information signals are generated, at step 218. In step 220, each of the information signals generated by the PDL analyzing units 202 are outputted from the PDL analyzing units 202, and, in step 224 the information signals are transmitted to the arbiter 204. Each of the signals are then arbitrated, conjunctively, with the arbiter 204 (step 224), the arbiter, in the preferred embodiment, including a set of rules. In one example the rules may be hard-coded, and in another example the rules may be programmed dynamically through use of a configuration file. An example of software suitable for use in implementing the arbiter 204 can be found in the attached Appendix. Preferably, the configuration file assumes a hierarchical form of the type shown in U.S. patent application Ser. No. 07/936,477, entitled "Apparatus and Method for Determining Printer Option Availability and Representing Conflict Resolution in a Combination of Print Job Selections", filed by Hower Jr. et al. on Aug. 28, 1992, the pertinent portions of which are incorporated herein by reference.

Since the configuration file is programmable, the arbiter can be altered readily in conformance with the needs of various clients. In one example, rules are dynamically reconfigured through use of the server rules line or the client server lines. That is, through use of the rules lines a client user or a server administrator can display the current rules on an appropriate display, and selected rules can be deleted and replaced with other desired rules. Through use of the rules inputs, the client user or server administrator may set printing priorities and/or precedents. For example, the decomposer 96 (FIG. 4) may be able to process Interpress IMG (i.e. a PDL written for Xerox ® 4000 printer format) but not Interpress RES (i.e. a PDL compatible with Xerox ® 6085 software, namely Viewpoint TM ). With this condition in mind, the server administrator may want to add a rule that permits a fault message to be transmitted to any particular client that may send a print job, written in Interpress RES, to the arrangement 70.

Through use of over-ride signals, either the client user or the server administrator can direct arbiter operation to correspond with various existing conditions of the printing system. For example, the client may wish to print a particular PS job as noninterpreted text so that he can perform diagnostics on that particular print job. Under certain circumstances the printing system would interpret the particular PS job and produce prints therefrom. Through use of the client over-ride signal, the client can direct the server to bypass interpretation of the particular PS job so that the job is printed in noninterpreted text rather than PS.

As mentioned above, one of the PDL analyzing units may include a binary filter, the binary filter being employed to collect statistics regarding the occurrence of binary characters in the print job stream. This prevents a data stream from fooling the arrangement 200 into reporting that a print job is written in PS when, for example, it happens to include an executable image that simply contains valid PS operators or keywords. The arbiter 204 uses the binary filter's knowledge of the print job stream to prevent it from reporting PS when the print job stream contains fewer than a selected percentage of binary characters. In one example the selected percentage is 50%.

After the information signals have been arbitrated with the arbiter 204, the resulting arbitrated signal, indicating the PDL of the print job stream, is transmitted to the host processor 72. As discussed above, the host processor uses this information to insure that the appropriate PDL interpreter resides in the Accelerator Coprocessor (FIG. 4).

Numerous features of the present disclosed embodiment will be appreciated by those skilled in the art:

One feature of the disclosed embodiment is efficient PDL analyzing of a print job stream. That is, a print job stream is scanned simultaneously by a plurality of PDL analyzing units, and each of the units is able to provide information simultaneously about the PDL type embodied by the stream. Moreover, the PDL analyzing units can provide information regarding the presence of a PDL version type in the print job stream.

Another feature of the disclosed embodiment is flexibility and extentability. That is, PDL analyzing units can be added and deleted as desired in a modular fashion. To accommodate for such addition(s) or deletion(s) an arbiter, which is used to filter the outputs of the PDL analyzing units, can be provided with a programmable, configuration file.

Yet another feature of the disclosed embodiment is tunability of the arbiter. The arbiter communicates with various inputs, which inputs can be used to program the arbiter dynamically. Moreover, the inputs permit the arbiter to be over-riden by either a client user or a server administrator.

What is claimed is:

1. A printing system for producing prints from a print job written in one of a plurality of page description languages with the print job assuming a form of a print job stream, comprising:

a plurality of page description language analyzing units for sampling the print job stream, each analyzing unit outputting an information signal which provides information regarding the print job stream; and a filter, receiving each of the information signals, for processing the information signals and outputting a filtered signal which indicates the page description language in which the print job is written, said filter including a set of rules for arbitrating conjunctively the information signals, the set of rules being dynamically configurable by a printing system user, said filter having a control line and said configuring including transmitting a control signal from the printing system user to said filter and, in response to receiving the control signal across the control line, said filter changing the set of rules so that said filter is provided with enhanced predictive capability.

2. The printing system of claim 1, further comprising a print server for interpreting the page description language of the print job to prepare the print job for printing.

3. The printing system of claim 2, wherein said print server includes said plurality of page description language analyzing units and said filter.

4. The printing system of claim 1, in which the print job stream includes an operator representative of the page description language in which the print job is written, wherein one of the information signals indicates that the representative operator is present in the print job stream.

5. The printing system of claim 1, in which the print job stream includes a plurality of operators representative of the page description language in which the print job is written and sets of selected operators follow a distribution indicating a frequency of occurrence of the sets of selected operators in the print job stream, wherein a certainty factor, varying as a function of the distribution, is outputted from one of said page description language analyzing units 6. The printing system of claim 5, in which the page description language of the print job is one of a plurality of versions, wherein the certainty factor varies as a function of which page description language version the print job assumes.

7. The printing system of claim 1, in which the page description language of the print job possesses a characteristic signature recognized by one of said page description language analyzing units, wherein said one of said page description language analyzing units translates the characteristic signature into one of the information signals.

8. The printing system of claim 1, further comprising a binary filter, sampling the print job stream and communicating with said filter, for providing said filter with an indication of a percentage of binary characters in the print job to prevent erroneously indicating that the print job is written predominantly in one page description language when it is written predominantly in another page description language.

9. The printing system of claim 1, wherein said changing the set of rules includes adding a rule to the set of rules or modifying a rule of the set of rules.

10. A method of determining a page description language of a print job, the print job being written in one of a plurality of page description languages and assuming a form of a print job stream, comprising the steps of:
communicating the print job stream to a plurality of page description language analyzing units;
generating a plurality of information signals from the plurality of page description language analyzing units, each of the information signals providing information regarding the print job stream;
transmitting the information signals to a filter; and
processing the information signals with the filter for generating a filtered signal that indicates the page description language in which the print job is written, said processing step including arbitrating conjunctively the information signals with a set of rules, the set of rules being dynamically configurable by a printing system user;
said filter receiving a control signal from the printing system user and changing the set of rules, in response to receiving the control signal, so that the filter is provided with enhanced predictive capability.

11. The method of claim 10, further comprising the step of transmitting the filtered signal to a print job translating unit which translates the page description language of the print job into another page description language.

12. The method of claim 10, in which the page description language is characterized by an operator, wherein said generating step includes providing one of the plurality of information signals with a certainty factor for indicating a frequency of occurrence of the operator in the print job.

13. The method of claim 12, in which the page description language is one of a plurality of versions, further comprising the step of indicating, with the certainty factor, which one of the plurality of versions is present in the print job stream.

14. The method of claim 13, in which the page description language is characterized by a signature, wherein said generating step includes indicating, with one of the information signals, the presence of the signature.

15. The method of claim 13, in which the print job includes a plurality of characters, further comprising the step of informing the filter of a percentage of binary characters in the print job so that the filter can determine the page description language of the print job

* * * * *